United States Patent [19]

Schneider

[11] 4,214,198
[45] Jul. 22, 1980

[54] ELECTRICAL POWER UNIT
[75] Inventor: Franklin R. Schneider, Seattle, Wash.
[73] Assignee: Dynamote Corporation, Seattle, Wash.
[21] Appl. No.: 829,955
[22] Filed: Sep. 1, 1977
[51] Int. Cl.² .............................................. H02J 7/14
[52] U.S. Cl. ...................................... 320/15; 307/16; 322/90
[58] Field of Search ............... 320/15, 17, 61; 322/28, 322/89, 90, 91, 93, 95; 323/10, 44; 219/133, 134; 307/16

[56] References Cited
U.S. PATENT DOCUMENTS

| | | | |
|---|---|---|---|
| 3,067,377 | 12/1962 | Johnson | 219/134 X |
| 3,206,610 | 9/1965 | Lovrenich | 320/15 |
| 3,304,485 | 2/1967 | Manz | 323/44 R |
| 3,555,395 | 1/1971 | Beery | 320/15 X |
| 3,667,025 | 5/1972 | Campbell | 320/15 |
| 3,962,621 | 6/1976 | Raver | 320/15 |

Primary Examiner—Robert J. Hickey
Attorney, Agent, or Firm—Graybeal & Uhlir

[57] ABSTRACT

An electrical power unit adapted to increase the DC power output of an electrical generating system of the type including a DC storage battery and an alternator which delivers AC voltage to the generating system. The AC voltage is stepped down and rectified to produce a first DC voltage. A voltage regulator having a field output connected to the field winding of the alternator, and an input connected to the battery and the first DC voltage, is operative to control the field winding of the alternator to maintain the first DC voltage at a relatively constant level. The first DC voltage may be applied to the battery to supply power thereto and to any load which may be connected to the battery. Increased power is provided when the regulator forces the alternator to produce AC voltage at a higher than normal voltage. When this higher voltage is stepped down and rectified to provide normal system DC voltage, greater than normal DC power is provided.

In another embodiment of the present invention the alternator AC voltage is also stepped down and rectified to produce a third DC voltage of higher voltage than both the first DC voltage and the battery voltage. The third DC voltage provides higher than normal voltage to the voltage regulator and hence to the field winding of the alternator, enabling it to produce still greater power. Since the third DC voltage makes the alternator self exciting, once started, the alternator will continue to produce adequate power levels even though the battery should become partially or completely discharged.

21 Claims, 6 Drawing Figures

ELECTRICAL POWER UNIT

BACKGROUND OF THE INVENTION

1. Field of the Invention

The present invention relates to an electrical power unit for increasing the DC power output of an electrical generating system of the type including a DC storage battery and an engine driven alternator which may supply DC power to both the battery and to any load which may be connected thereto. More particularly, the present invention relates to such an electrical power unit which increases the DC power output of the generating system by increasing the AC voltage output of the alternator by using a step down transformer to reduce said voltage to normal system levels. Output of the alternator may be also increased by providing an auxiliary DC voltage of a higher than normal voltage to the field winding of the alternator, independently of the battery. This has the added advantage of making the alternator self exciting, once started.

2. Description of the Prior Art

Modern day, engine-powered land and marine vehicles of many types require that DC power be available at relatively high power levels to supply the many DC powered devices with which they are equipped. Typical examples of vehicles which may require a relatively high DC power supply are boats, ambulances, police cars, fire engines, energy aid units, and the like.

A conventional electrical system for an engine-powered land or marine craft usually includes a DC battery, an alternator adapted to deliver low voltage DC power to the vehicle electrical system and a voltage regulator connected therebetween and adapted to control the voltage output of the alternator in response to the charge variation of the battery. Typical alternators in use today include a stator having three windings connected to provide a three phase AC output and a rotor with a field winding appropriately driven by the engine. Alternators of this type generally include a rectifying circuit adapted to transform the AC voltage to low voltage DC which is then used to charge the vehicle battery and to power the vehicle electrical system and any loads which may be connected thereto.

Other alternators are equipped with terminals by which the alternator's three phase AC output may be tapped directly before rectification and then utilized to provide three phase AC power which can then be employed for many purposes.

It is known to provide auxiliary DC power by modifying the vehicle's electrical system by adding a second or "piggyback" alternator, often mounted adjacent the vehicle's original alternator. The "piggyback" alternator is driven mechanically by belts from the vehicle engine in much the same manner as is the vehicle's original alternator. Such "piggyback" alternators are often difficult and expensive to install due to the often crowded conditions of the vehicle engine compartment. In addition, such a solution to the insufficient power problem involves the added cost of the second alternator, while decreasing overall system reliability by doubling the possibility of a breakdown in the vehicle's electrical systems, since two alternators are, on the average, twice as prone to failure as is a single alternator. As can be appreciated, in all land or marine vehicles reliability is an important criterion which becomes doubly important when the vehicle is used as an emergency, rescue, or police vehicle.

Increasing the size of a conventional alternator to provide all the high DC power requirements which may be needed is a costly solution, and the increased size of such a unit raises the possibility of difficult installation or even lack of adequate room to mount it in the engine compartment.

BRIEF SUMMARY OF THE INVENTION

In basic form, the present invention comprises an electrical power unit adapted to increase the DC power output of an electrical generating system of the type including an engine driven alternator which supplies power to a DC storage battery and which has a field winding controlled by a voltage regulator responsive to the DC voltage output of the system. The DC power output of the alternator is increased by forcing the alternator to produce AC voltage at a higher than normal voltage and then supplying said higher than normal voltage to the primary winding of a step down transformer. Increased power output results when the first lower AC voltage output of the step down transformer is rectified to produce a first DC voltage at the lower, desired system level. This first DC voltage may then be applied to the battery and any load which may be attached thereto. Thus, it is a primary object of the present invention to provide an electrical power unit which utilizes the inherent reserve generating capacity of a conventional alternator to produce additional power by forcing the alternator to produce AC voltage output at a higher than normal voltage. It is also an object of the present invention to provide increased DC power output from such an alternator by using a step down transformer and rectifier to provide the desired, lower first DC voltage, which is maintained at a relatively constant level by the voltage regulator which is responsive to the level of said first DC voltage.

Another embodiment of the present invention includes applying said first DC voltage to a second battery and to any load which may be connected thereto while providing means for electrically isolating the batteries from each other. Consequently, it is an object of the present invention to provide an electrical power unit which supplies power to two batteries and any loads which may be connected thereto, and which permits discharge or depletion of one battery independently of the other.

Further embodiments of the present invention provide that, in either the single or double battery configuration, the step down transformer includes a second secondary winding which provides a second lower AC voltage wich is rectified to produce a second DC voltage which is of higher voltage than said first DC voltage. The DC voltage is applied to the input terminal of the voltage regulator independently of the battery. These embodiments of the present invention satisfy the objective to make the alternator self exciting in that once the alternator is running, the battery may be partially or completely discharged or even removed from the system without loss of power output from the alternator since said former DC voltage continually supplies power to the alternator's field winding independently of the battery. Further, since said second DC voltage may be specified as higher than both the characteristic voltage of the batteries and said first DC voltage, this construction enables satisfaction of another objective of the present invention which is to increase the power output of the alternator still further by supplying the input to the voltage regulator with said second DC voltage to enable the regulator to in turn supply the field coil of the alternator with a higher voltage.

In the twin battery configuration, another embodiment of the present invention provides for relay switches operative to disconnect one battery from any load attached thereto and then to connect the batteries in parallel. This construction satisfies a further objective of the present invention which is to insure continued operation of the vehicle even though one battery may become partially or completely discharged by disconnecting the other battery from its load and connecting the batteries in parallel.

A further object of the present invention is to provide an electrical power unit which can provide relatively high current DC power not only in conjunction with the heretofore described vehicle electrical systems, but also in conjunction with such an electrical system at a fixed location.

Further objects of the present invention are to provide an unusually reliable, low-cost electrical power unit which is operable for boosting the DC power output of an alternator over that provided by a conventional vehicle's electrical system.

DESCRIPTION OF THE PREFERRED EMBODIMENTS

Figure 1:
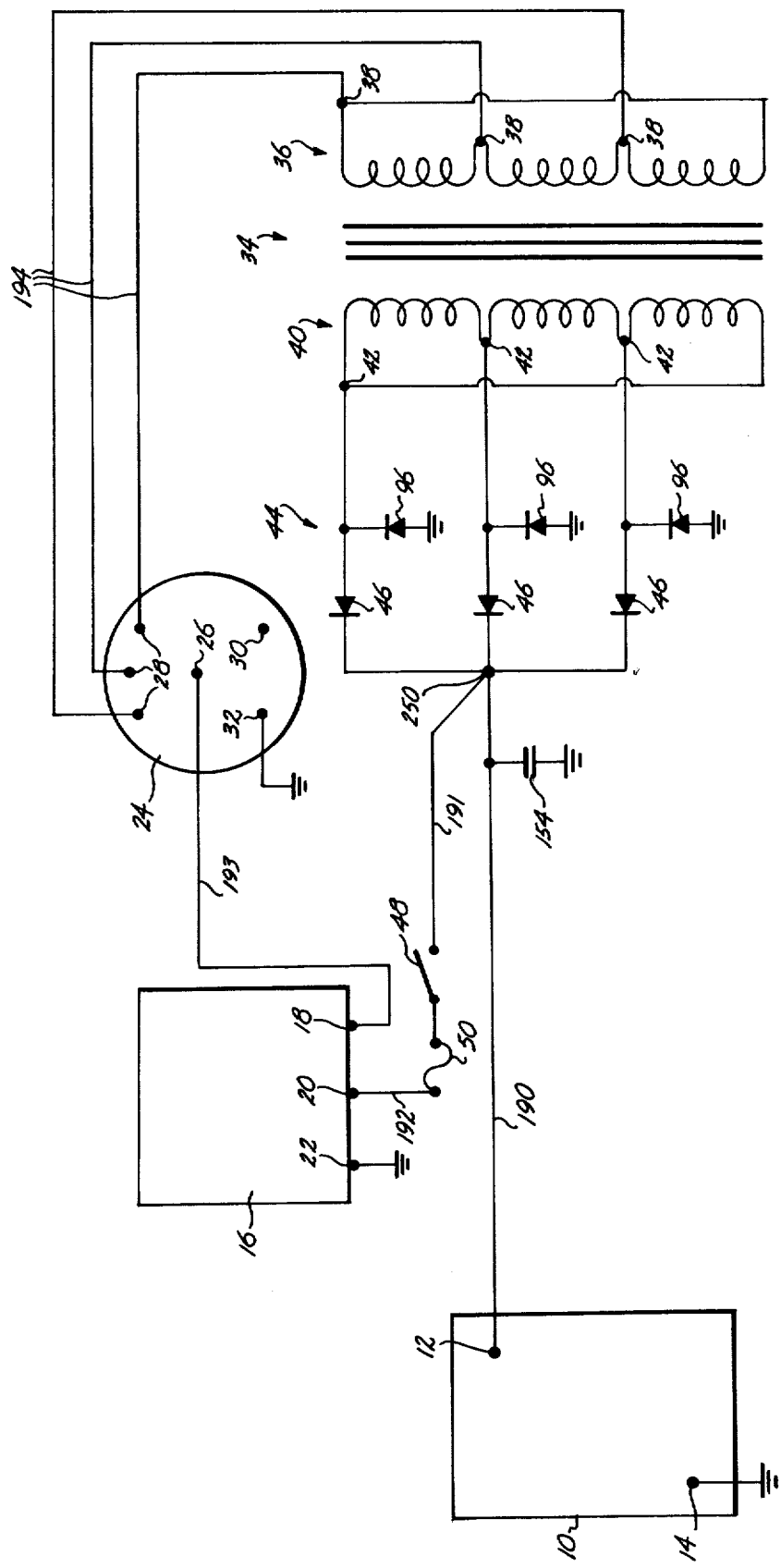
FIG. 1 is a schematic drawing of the electrical circuitry of the electrical power unit of the present invention in its most basic form.

While the present invention is discussed herein primarily with respect to use in conjunction with a vehicular electrical system, it will be understood that it may also be employed in conjunction with engines at fixed locations to provide high current DC power.

It should be noted that throughout all of the following descriptions of the preferred embodiments of the present invention all components will be sized so as to produce an electrical power unit compatible with a 12 volt DC vehicle electrical system. Of course, it is expressly understood that by suitable sizing and design, the present invention can be easily adapted to be compatible with electrical systems of other voltages, or to produce DC power outputs at terminals 250, 251 and 252 of other voltages without departing from the scope of the present invention. In the various embodiments shown in FIGS. 1-4, the same components are given the same reference numerals throughout.

In all the figures, battery 10 is a 12 volt DC rechargeable storage battery of conventional design having a positive terminal 12 and a negative or ground terminal 14. As has been stated, although a 12 volt battery is specified, it is to be understood that the electrical power unit of the present invention can be readily adapted by those skilled in the art to perform satisfactorily with a battery having a different voltage.

Voltage regulator 16 is of conventional design and operation, such as voltage regulator model 5016R manufactured by the Sheller-Globe Corp., Leece Neville Div., of Cleveland, Ohio.

Alternator 24 is also of conventional design and construction such as alternator Model 7700 AA manufactured by the Sheller-Globe Corp. above. The alternator has a stator having three windings connected to provide a three phase AC output at terminals 28 when its engine driven rotor carrying a field winding, not illustrated, is rotated. Terminal 26 is connected to the field winding of the alternator, and terminal 32 is connected to ground. The alternator includes an internal rectifier, not illustrated, which delivers DC voltage to terminal 30 to supply DC power to the vehicle's electrical system when said alternator is conventionally utilized. However, neither terminal 30 nor the alternator's internal rectifier is utilized in the present invention.

It should be noted that by not utilizing the internal rectifier normally present in a conventional alternator, a substantial amount of internal alternator heat normally developed by said internal rectifier is eliminated, thereby further enhancing the ability of the present invention to augment the power output capability of a conventional alternator since a source of heat build-up within the alternator is eliminated. Because the normal DC output terminal 30 of the alternator is not utilized in the present invention, it is seen that, in a sense, the present invention involves isolating the alternator from the vehicle's electrical system, except as subsequently described.

Figure 5:
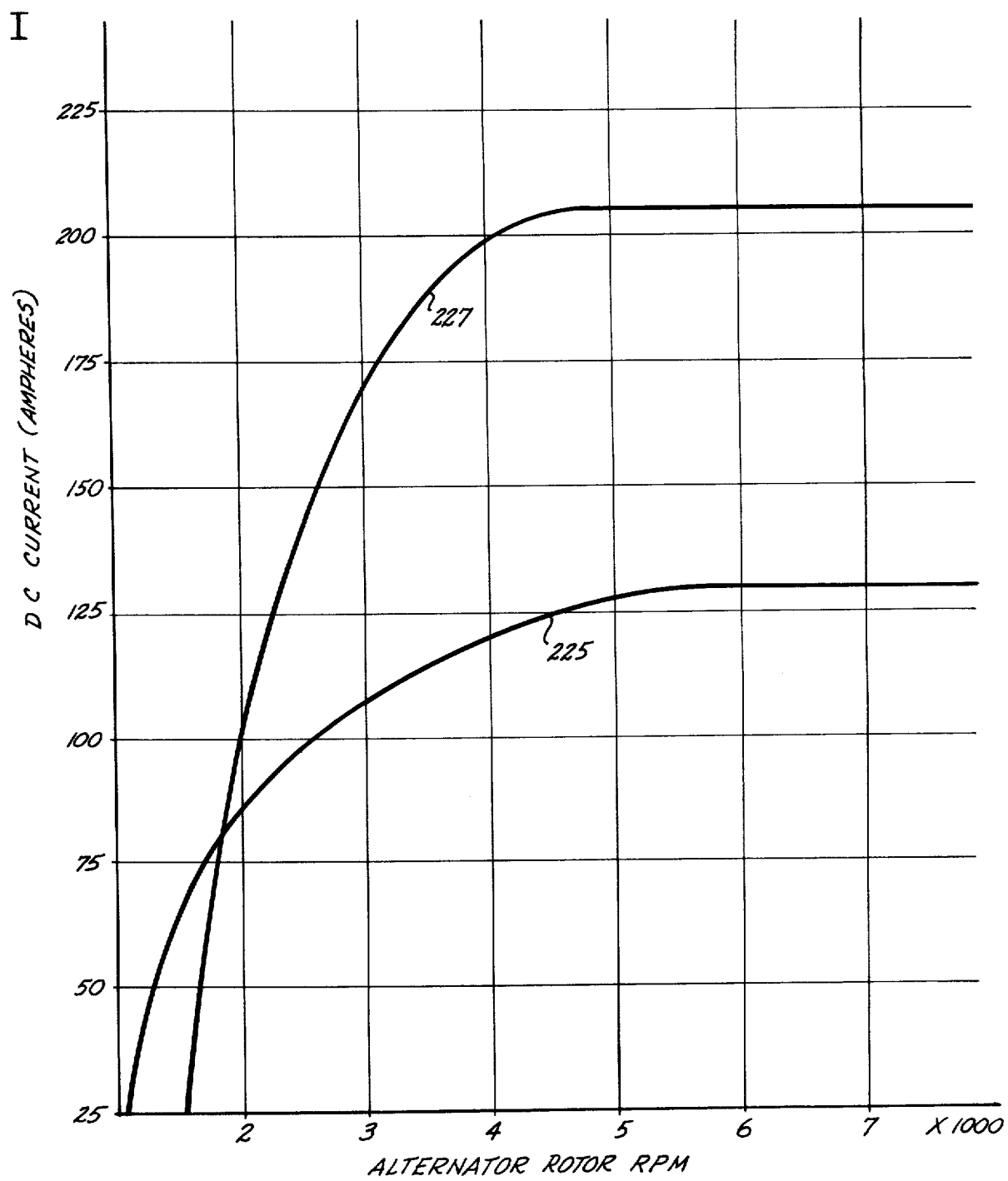
FIG. 5 is a graphic description showing comparative outputs of the present invention.

As can be appreciated, the power output of the alternator and hence the power output of the electrical power unit of the present invention is proportional to the rotor RPM of the alternator, as shown in FIG. 5. When installed in a vehicle whose engine is idling, it is apparent that the rotor of the alternator may not be driven at a RPM (rotations per minute) sufficient to supply a high DC power output from the present invention. Consequently, a governor, which forms no part of the present invention, may be utilized to maintain the alternator rotor RPM at an amount sufficient to provide the desired DC power output. Referring to FIG. 5, it can be seen that in order to provide a DC power output of about 170 amps, for example, the rotor of the alternator must be driven at approximately 3,000 RPM. Obviously, the engine RPM required to obtain the desired alternator rotor RPM will depend upon the sizing of the pulleys on the engine and the rotor. However, once such sizing is determined, an adequate governor can be easily constructed to maintain the desired rotor RPM.

Applicant presently utilizes a single speed governor of conventional construction which maintains the alternator at about 3,000 RPM. The power to the governor is connected through switch 48 in FIGS. 1-3, and switch 138 in FIG. 4, so that the governor is automatically turned on when switch 48 or 138, which activates the present invention, is closed. Alternatively, a variable speed governor having an input connected between the first rectifier output terminal 250 and the ground terminal 14 of the battery, for example, may be used, such as that disclosed in my U.S. Pat. No. 3,456,119, granted July 15, 1969. Of course, the RPM of the engine can be manually controlled by the operator of the vehicle suitably manipulating the throttle control of the engine.

Referring now more specifically to the embodiment of the present invention set forth in FIG. 1, when switch 48 is closed, power is supplied to terminal 20 of the voltage regulator 16 from the battery 10 through wires 190, 191, switch 48, fuse 50 and wire 192. Fuse 50 is chosen to provide optimum protection for the voltage regulator 16 and the alternator field winding, and may typically be a 7.5 ampere device. As seen, terminal 22 of the regulator is grounded. The voltage regulator in turn supplies power to the field terminal 26 of the alternator, and thus to the alternator's field winding, through regulator terminal 18 and wire 193. For a system utilizing a 12 volt battery, the voltage available at terminal 18 should not exceed 16 volts to avoid damage to the alternator field winding. Thus, the alternator 24 is excited by the voltage regulator 16 and puts out boosted three phase AC voltage from terminals 28. It should be noted that although applicant's present invention is shown utilized in conjunction with an alternator which produces three phase AC voltage, it could easily be adapted, by those skilled in the art, for use in conjunction with an alternator producing single phase AC power, or other forms of AC power.

The boosted three phase AC voltage from alternator terminals 28 is conveyed by wires 194 to the primary terminals 38 of the primary winding 36 of a three phase AC step down transformer generally designated at 34. The secondary winding 40 of the transformer 34 produces a three phase, first lower AC voltage at secondary terminals 42. Transformer 34 is of conventional construction, and has a primary to secondary turns ratio of 1.5 to 1. Transformer 34 could also be a step down three phase AC auto transformer having primary terminals 38 and secondary terminals 42.

This first lower AC voltage is then rectified by a solid state three phase AC rectifier generally designated at 44 comprising three negative diodes 96 and three positive diodes 46 wired as shown and producing a first DC voltage at terminal 250. Diodes 96 and 46 are both manufactured by FMC Corp. of Johnstown, Pa. under part numbers R3720 and S3720 respectively, and are rated at 85 amperes at 200 volts DC. Wire 190 connected between terminals 250 and 12 provide DC power to the battery 10 and to any loads which may be attached thereto. Wire 191, also connected to the first rectifier output terminal 250, conveys said first DC voltage to terminal 20 of the voltage regulator 16 through switch 48, fuse 50 and wire 192. Said first DC voltage thus applied to terminal 20 of the regulator 16 provides a reference point for the regulator by which the regulator can control the alternator field, through wire 193 which connects regulator terminal 18 and alternator field terminal 26, in response to changes in said first DC voltage at terminal 250 to maintain said first DC voltage at a relatively constant, desired level. In a 12 volt battery system, said first DC voltage is typically maintained at 14 volts DC in order to provide proper charging for the battery 10. Capacitor 154 is a filter capacitor to smooth the DC output at terminal 250.

The alternator 24, as supplied by the manufacturer, is capable of producing a maximum of 1,820 watts, having a maximum output at terminal 30 thereof, of 130 amperes DC at 14 volts DC. However, the electrical power unit of the present invention, when the transformer 34 has a primary to secondary turns ratio of 1.5 to 1, is capable of producing a maximum of about 2,730 watts, having a maximum output of about 195 amps DC at 14 volts DC at terminal 250. Thus, it is seen that the normal output power of the alternator 24 is increased by the present invention at about the same ratio as that of the turns ratio in the transformer. Applicant has even used a turns ratio of 2:1 in his transformer 34 without failure of his electrical unit. Of course, other transformer ratios besides the example given can be used to provide various alternator output amplification rates without departing from the scope of the present invention. It will also be appreciated that it is advantageous to use the lowest transformer ratio which will provide the required power output at the lowest alternator rotor speed. Of course, too high a transformer ratio will raise the voltage at terminals 28 of the alternator to the point where the alternator will short out or fail from overheating due to the increased power it produces.

In summary, it can be seen that applicant's present invention has ingeniously utilized the inherent reserve voltage and current handling capabilities of a conventional alternator to significantly enhance the power output thereof. As has been seen, voltage regulator 16 forces the alternator 24 to produce significantly higher than normal three phase AC voltage at terminals 28 at the same maximum amperage. (About 22 volts RMS vs. 14 volts RMS, both at a maximum of 130 amperes RMS). Such higher than normal three phase AC voltage is then supplied to step down transformer 34 and to three phase AC rectifier 44 to produce a first lower DC voltage at terminal 250 at 14 volts DC and a maximum current of 195 amperes. As is known, when a given voltage is applied to the primary of a step down transformer, the current available across the secondary of the transformer varies inversely as the ratio of the voltages applied across the primary and secondary windings thereof, resulting in increased current output.

Figure 2:
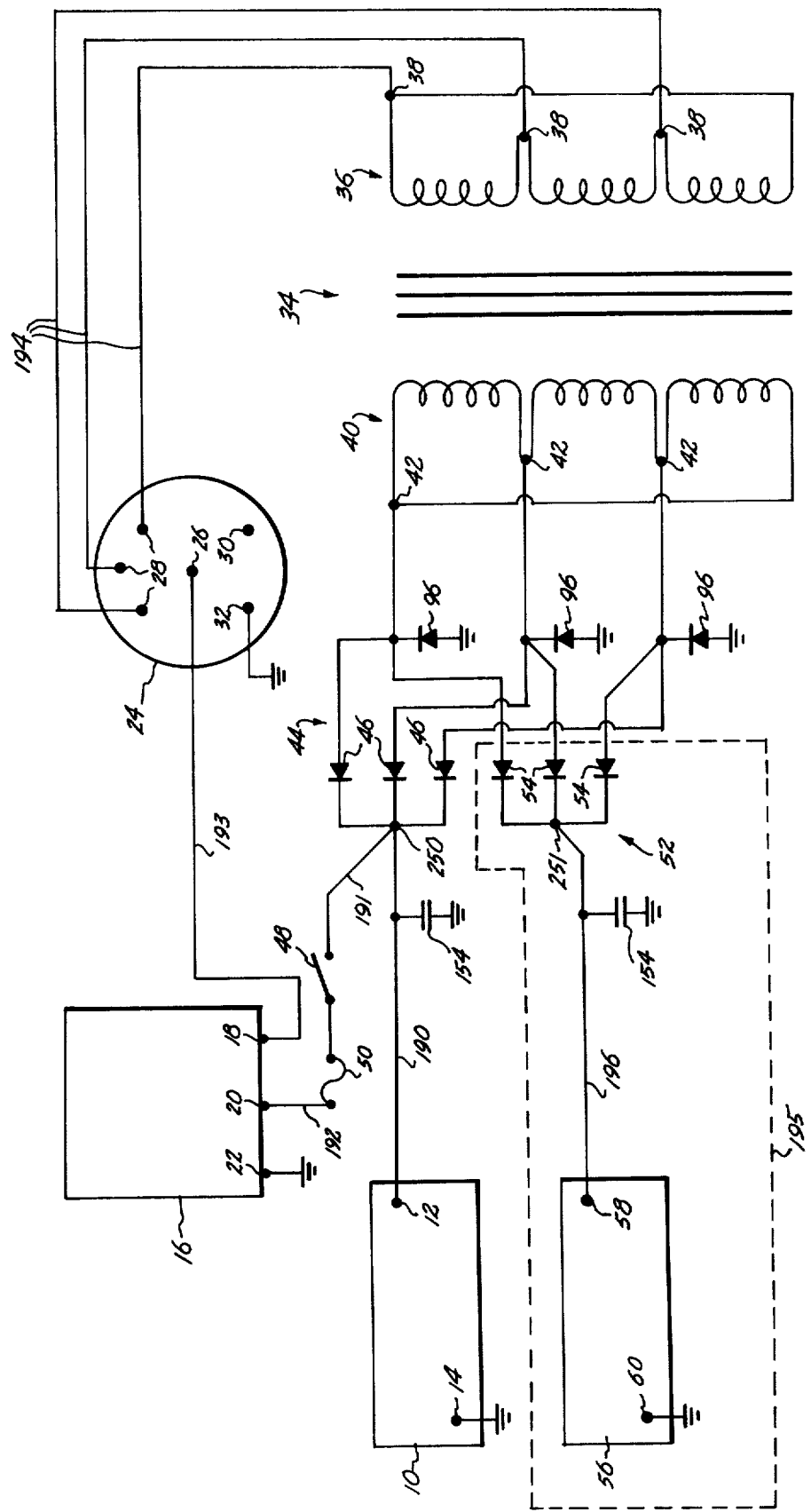
FIGS. 2-4 are schematic drawings of the electrical circuitry of other embodiments of the electrical power unit of the present invention.

A second embodiment of the present invention is shown in FIG. 2. Aside from the additional components shown enclosed by dotted line 195, the construction, performance and operation of this embodiment of the present invention is identical to that shown in FIG. 1, and hence the previously given description will not be repeated. In FIG. 2, it is seen that connected to the output terminals 42 of the step down transformer 34 is a second solid state three phase AC rectifier, generally designated at 52 which is identical to previously described rectifier 44. As seen, rectifier 52 employs three positive diodes 54 which utilize the same three negative diodes 96 which were utilized in conjunction with the positive diodes 46 of rectifier 44. Rectifier 52 produces a second DC voltage of 14 volts at the second rectifier output terminal 251.

Of course, the single set of negative diodes 96 must be of sufficient size to handle the total power output of both rectifiers 44 and 52. However, it is to be understood that rectifiers 44 and 52 need not utilize in common negative diodes 96 but could, instead, each have their own set of three negative diodes 96. In such event, rectifier 52 would be of identical construction as rectifier 44 shown in FIG. 1, having its three negative diodes 96′, not illustrated, connected to transformer output terminals 42 and its positive diodes 46′ connected to a second rectifier output terminal 251.

A wire 196 connects the second rectifier output terminal 251 to the positive terminal 58 of a second 12 volt, rechargeable DC storage battery 56 having a negative terminal 60 grounded as shown. Thus, battery 56 and any load which may be applied thereto may be supplied with power from terminal 251. Consequently, the high current DC output of the electrical power unit of the present invention has a dual path, with a first DC voltage available at the first rectifier output terminal 250 of rectifier 44, and a second DC voltage available at the second rectifier output terminal 251 of rectifier 52. Of course, the first and second DC voltages are equal, each being 14 volts.

As will be appreciated, one feature of the dual sets of positive diodes 46 and 54 are that they allow the application of power to batteries 10, 56, and any loads which may be attached thereto, while keeping said batteries electrically isolated from each other so that either battery may be discharged without affecting any electrical drain on the other. In an engine off situation, where there is no output from the accessory unit described herein, battery 56 can be discharged independently of battery 10 because diodes 46 of rectifier 44 block current flow from battery 10, keeping it in charged condition for such critical vehicle functions as ignition and engine cranking. Similarly, in an engine off situation, battery 10 can be discharged independently of battery 56 because diodes 54 of rectifier 52 block current flow from battery 56, keeping it in a charged condition.

It should be noted that the voltage regulator sensing lead 191 can be attached to either terminal 250 of rectifier 44 or terminal 251 of rectifier 52, which similar results. However, it is preferred that lead 191 be attached to the rectifier terminal 250 or 251 whose associated battery 10 or 56 is loaded at all times. The battery which is normally loaded at all times is usually the vehicle's chassis battery. Thus, if battery 10 were the vehicle's chassis battery, sensing lead 191 would preferably be attached to terminal 250, while if battery 56 were the vehicle's chassis battery, sensing lead 191 would preferably be attached to terminal 251. If wire 191 were attached to either terminal 250 or 251 which was connected to an unloaded battery 10, 56, after prolonged charging of that unloaded battery, such battery would experience full charge and the voltage across it would increase to where the voltage regulator 16 will begin to turn off. This would provide erratic charging to the battery which was in use. Filter capacitor 154 is connected between terminal 251 and ground to smooth out the DC voltage at terminal 251.

Figure 3:
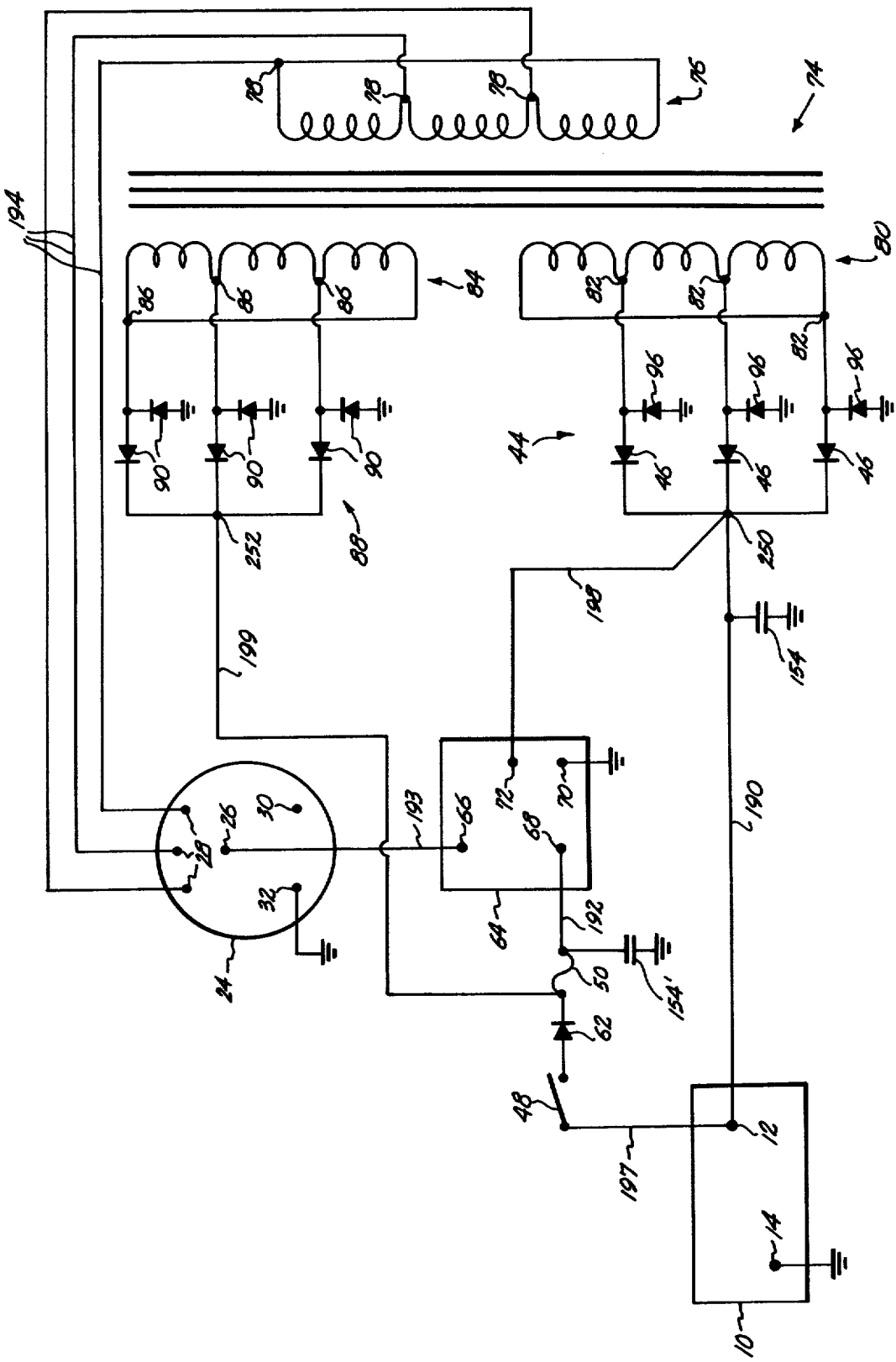
Figure 4:
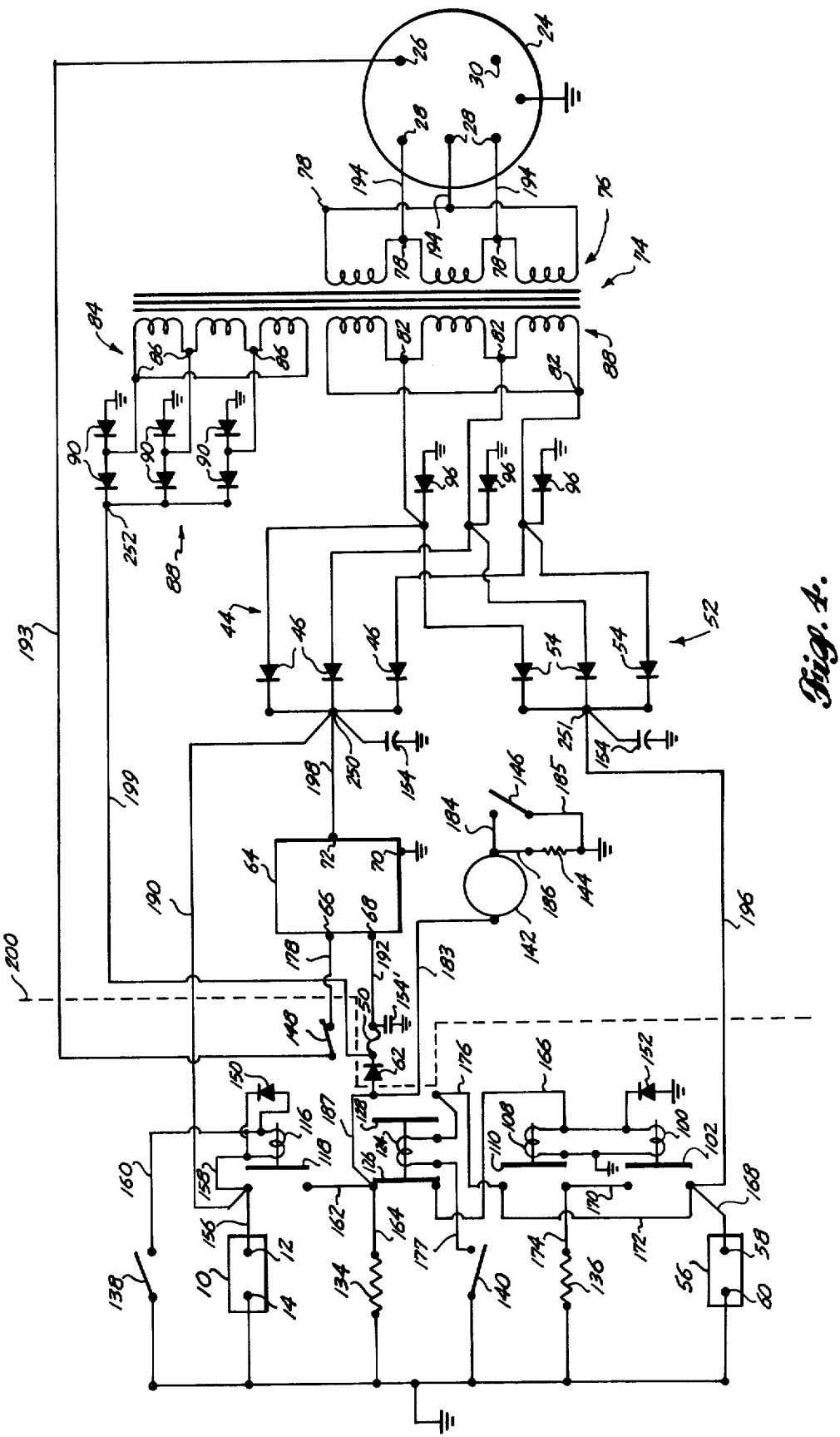

Referring now to the embodiments of the present invention shown in FIGS. 3 and 4, it should be noted that in a conventional vehicle electrical system having an engine driven alternator adapted to deliver DC power to the vehicle's electrical system, and a voltage regulator connected therebetween and adapted to control the output voltage of the alternator, situations are often encountered where the vehicle's battery becomes drained to a low state of charge and/or a load of such magnitude is applied to the vehicle's electrical system that the system's voltage is pulled down to a point where sufficient voltage cannot be supplied to the alternator's field winding. In such cases, the alternator is inadequately excited and cannot respond with adequate charging and the vehicle's whole electrical system may fail. To prevent this possibility, and to further increase the power output of the alternator 24 over that of the embodiments shown in FIGS. 1 and 2, the embodiments of the present invention shown in FIGS. 3 and 4 have been devised by applicant.

It should be noted that voltage regulator 64 used in the embodiments shown in FIGS. 3 and 4 differs considerably from the voltage regulator 16 used in the embodiments of the present invention shown in FIGS. 1 and 2. The details of the construction of regulator 64 will be given subsequently in greater detail, sufficing it now to say that regulator 64 has four terminals: terminal 70 being connected to ground; sensing terminal 72 being connected to first rectifier output terminal 250 by wire 198; battery terminal 68 being connected to the positive terminal 12 of battery 10 through components 192, 50, 62, 48 and 197; and field terminal 66 being connected to the field terminal 26 of the alternator 24 by wire 193. Regulator 64 operates similarly to regulator 16 by controlling the field of the alternator through wire 193 in response to variations in the first DC voltage at terminal 250 of rectifier 44, to maintain said first DC voltage at a relatively constant, desired level. Filter capacitor 154 is connected between terminal 250 and ground to smooth the DC voltage at terminal 250. Filter capacitor 154', connected between fuse 50 and ground, performs a similar function.

Referring now to the operation of the embodiment of the present invention shown in FIG. 3, when the alternator rotor is being turned at sufficient speed by the vehicle engine, the electrical power unit of the present invention is activated by closing switch 48 to provide voltage to terminal 68 of regulator 64 from positive terminal 12 of battery 10 through components 197, 48, 62, 50 and 192. In turn, the voltage regulator 64 supplies voltage from terminal 66 thereof to the field winding of the alternator through terminal 26 thereof through wire 193. Thus, the alternator's field winding becomes excited and the alternator 24 supplies three phase AC power to the input terminal 78 of the three phase AC step down transformer 74 from alternator terminals 28 through wires 194. The primary and secondary windings 76, 80 of transformer 74, having a turns ratio of 1.5 to 1, operate in an identical manner as to the primary and secondary windings 36, 40 of transformer 34 to produce a first lower AC voltage at terminals 82 of transformer 74, identical to that produced at terminal 42 of transformer 34. Rectifier 44 of FIG. 3 is identical to previously described rectifier 44 of FIG. 1, and rectifies the first lower AC voltage at terminals 82 of transformer 74 to produce a first DC voltage of 14 volts at first rectifier output terminal 250. The first DC voltage available at terminal 250 is conveyed to the positive terminal of battery 10 by wire 190 to supply power to the battery 10 and to any load which may be attached thereto. Transformer 74 may, of course, be a step down, three phase, AC auto transformer having primary terminals 78, and secondary terminals 82 and 86.

The features of the embodiment of the present invention of FIG. 3 which differ from those of the embodiment shown in FIGS. 1 and 2 are chiefly that a second, secondary winding 84 of transformer 74, and an associated rectifier 88 are provided. During operation, secondary winding 84 provides a three phase, second lower AC voltage at terminals 86 which is converted to a third DC voltage at third rectifier output terminal 252 by rectifier 88. Rectifier 88 is a 15 ampere solid state three phase rectifier assembly manufactured by Solitron Corp. of San Diego, California which has a part number of H768-4. As seen, rectifier 88 comprises 6 diodes 90, connected as shown.

Since, as will be seen, the sole function of rectifier 88 is to provide power to the field winding terminal 26 of the alternator, diodes 90 can all be relatively low current diodes because they handle a maximum of approximaely fie amperes in most standard vehicle electrical systems utilizing a 12 volt battery 10. Typically, in such a 12 volt system, a turns ratio is chosen for the primary and secondary windings 76, 84 of transformer 74 which will supply a third DC voltage at the third rectifier output terminal 252 of rectifier 88 which is about three to four volts higher than the voltage at the first rectifier output terminal 250 of rectifier 44. For a twelve volt system, the turns ratio of the primary 76 to secondary 84 winding of transformer 74 is 17 to 14, producing 18 volts DC at terminal 252.

The third DC voltage at terminal 252 is conveyed to one side of fuse 50 by wire 199 as shown. At the time that the voltage at terminal 252, and hence at fuse 50 exceeds the battery voltage at terminal 12, current stops flowing from the battery terminal 12 through diode 62, as diode 62 simultaneously begins to block current flow from terminal 252 to the terminal 12 via wire 199. Since the third DC voltage is optimally three to four volts higher than the first DC voltage available at terminal 250 of rectifier 44, diode 62 functions to prevent current flow from the rectifier 88 to the battery 10 and electrical system of the vehicle, thereby preventing any component burn-out and/or over charging of the battery 10 which would otherwise result. From testing of the system heretofore specified with respect to a vehicle utilizing a 12 volt battery it has been found that in worse case conditions, after all system voltage drops are considered including those in the voltage regulator 64, a minimum third DC voltage of 14 volts is available from the third rectifier output terminal 252 for alternator field excitation when adequate alternator rotor speed is maintained. Of course, the voltage at terminal 66 of the regulator 64 must not exceed that which is safe to use with the field winding of the particular alternator being used. Typically, for a conventional alternator designed to provide DC power to a 12 volt electrical system the DC voltage available at terminal 66 of regulator 64 should not exceed 16 volts. It is noted that two volts are typically dropped across the regulator's components, thereby reducing the third DC voltage of 18 volts to 16 volts at terminal 66 of the regulator.

Comparative output curves for the embodiment of the present invention shown in FIG. 3 over that of the alternator operated in conventional fashion are shown in FIG. 5. In FIG. 5, alternator rotor RPM times 1,000 are plotted on the horizontal axis while the current in amperes at output terminal 250 of rectifier 44 is plotted vertically. Line 225 represents the DC current output at terminal 30 of the alternator operating in a conventional fashion. Line 227 represents the DC current output at terminal 250 of the embodiment of the present invention shown in FIG. 3. As is seen, applicant, through his unique invention is able to increase the maximum DC output of the conventional alternator from about 130 amperes to about 205 amperes. It is noted that the increase in maximum DC ampere available from the embodiment of the present invention shown in FIG. 3 over the embodiments of FIGS. 1 and 2 (195 amperes and 160 amperes) is due solely to the addition of the second, secondary winding 84 of transformer 74 and the associated circuitry. In all of the embodiments of the present invention shown in FIGS. 1-3, the turns ratio of the primary 36, 76 to secondary 40, 80 is 1.5 to 1. It is noted that in the embodiment of the present invention shown in FIG. 3, the maximum AC volts available from terminals 28 of alternator 24 is 22 volts.

In an identical fashion to that in which the components encircled by the dashed line 195 in FIG. 2 where added to the embodiment ot the present invention shown in FIG. 1, so too can such material enclosed by the dashed line 195 in FIG. 2 be added to the schematic diagram shown in FIG. 3. Inasmuch as a complete description of the connection, function and operation of the material enclosed by said dashed line 195 has been explained in reference to FIG. 2, their operation will not be again explained in connection with their addition to the embodiment of the present invention shown in FIG. 3.

With reference to FIG. 4, it should be noted that all of the embodiments of the present invention heretofor described with respect to FIGS. 1-3 may be easily found in the schematic of FIG. 4. For example, all of the components to the right of the generally vertical dashed line 200 in FIG. 4 comprise components of the electrical circuit comprising the embodiment of the present invention set forth in the preceeding paragraph and operate as heretofore described. To obtain the circuit as set forth in the preceeding paragraph, from the circuit shown in FIG. 4, one would have to remove the electric fan 142 and its associated circuitry. In addition, terminal 12 of a battery 10 having a grounded negative terminal 14 would have to be connected adjacent to the left side of diode 62 to provide power input to the voltage regulator 64 as has been previously described, and wire 190 would similarly have to be attached to terminal 12 of said battery 10. Similarly, wire 196 would have to be modified to connect rectifier 52 output terminal 251 to positive terminal 58 of a battery 56 having a grounded negative terminal 60, and wire 193 from alternator 24 would have to be connected to terminal 66 of regulator 64.

Turning now to the embodiment of the present invention schematically illustrated in FIG. 4, we see an essentially complete electrical power unit, as has been previously described, modified to further include all circuits and relays for a dual battery installation.

When the power switch 138 is closed, it is seen that electrical power is supplied to solenoid coil of relay 116 from terminal 12, battery 10 through wires 156 and 158. After leaving the solenoid coil, electrical power is conveyed to the switch 138 by wire 160. This causes normally open contactor 118 to close, supplying power to load 134 from terminal 12 of battery 10 through components 156, 118, 162 and 164. Closing of contactor 118 also supplies power to the solenoid coils of relays 108 and 100 from terminal 12 of battery 10 by way of components 156, 118, 162, 126 and 166. Relays 108 and 100 are thus energized and their contactors 110, 102 close and provide battery power from battery 56 to a load 136 by way of components 168, 102, 170 and 174. Power is also supplied to load 136 from terminal 58 of battery 56 by way of components 168, 172, 110 and 174. It is noted that relays 108 and 100 and their associated contactors 110 and 102 are connected in parallel. Of course, a single relay could be substituted therefor, but applicant has shown such a parallel arrangement because he has found that commercially available relays are difficult to obtain which are capable of handling the high current output of the subject invention.

It is seen that current from the first rectifier output terminal 250 of rectifier 44 is applied to the battery 10 and its associated load 134 through wires 190 and 156, and through components 190, 118, 162 and 164, respectively. Current flow from the second rectifier output terminal 251 of rectifier 52 is similarly supplied to battery 56 through wires 196 and 168, and to load 136 through components 196, 102, 170 and 174 or components 196, 172, 110 and 174.

In operation, when the alternator rotor is driven by the engine and when contactor 118 closes, power is also supplied to the voltage regulator 64 from terminal 12 of battery 10 by way of components 156, 118, 162, 187, 62, 50, and 192. The regulator 64 then turns on and excites the alternator 24 by way of components 178, 148 and 193. The alternator then provides three phase AC power to transformer 74 and rectifiers 44, 52 and 88 to produce said first, second and third DC voltages at rectifier output terminals 250, 251, 252, respectively. Voltage from said third rectifier terminal 252 is applied to regulator terminal 68 through components 199, 50 and 192. Operation of the various components including transformer 74, rectifiers 44, 52 and 88 and voltage regulator 64 have been previously described with respect to the embodiment shown in FIG. 3.

Additionally, the alternator's positive DC output at terminal 30 is available for use to power a higher voltage DC load device. With a 2:1 primary 76 to secondary 80 turns ratio of transformer 74, a 28 volts DC output may be obtained at said terminal 30.

A cooling motor 142 may be provided to cool the components of the present invention. Motor 142 obtains its power from battery 10 through components 183, 187, 162, 118 and 156. Negative lead 186 of the motor is taken to ground through a three ohm, 25 watt resistor 144. Resistor 144 keeps the motor at low speed to reduce its noise level. Heat from the rectifiers 44, 52 and 88 of the present invention is monitored by a thermostatically controlled switch 146, of conventional construction and when the temperature of said rectifiers exceeds a predetermined level, say 150° F., switch 146 closes, bypassing resistor 144 by way of leads 184 and 185 taking the negative motor lead directly to ground which causes the fan to run at full speed providing additional cooling for the various components comprising the present invention.

A second thermostatically controlled switch 148, of conventional construction, is also provided in the circuit connecting the field terminal 66 of the regular 64 and the field terminal 26 of the alternator 24. In the event that the temperature of said rectifiers continues to rise even after thermostatically controlled switch 146 closes causing the motor 142 and its associated fan to run at full speed, thermostatically controlled switch 148 automatically opens when the temperatures of said rectifiers 44, 52 and 88 exceed a certain predetermined limit, say 250° F. When switch 148 opens, the voltage from the voltage regulator terminal 66 which controls the field winding of the alternator 24 is cut off, turning off the alternator and thus the entire electrical power unit of the present invention. When the loads and resulted temperatures are reduced to tolerable levels, thermostatically controlled switch 148 closes and turns electrical power unit of the present invention back on, as can readily be appreciated from the foregoing description of the operation of the present invention.

Emergency switching is also provided in the present invention. Let us assume that load 134 represents the chassis load of the vehicle on battery 10. The chassis load being the starter, ignition system, and the like which are necessary for operation of the vehicle. Let us further assume that any body load, such as warning lighting and emergency equipment, and auxiliary equipment such as radios, air conditioning, resuscitators and like are represented by load 136 which receives power from battery 56.

In the event there should be a component failure so that low or no voltage is available for vehicle operation, switch means have been provided to switch both batteries 10 and 56, and the total DC voltage output from rectifier output terminals 250 and 251 to the battery 10, and hence to the chassis load 134. This will ensure the availability of power to the starter, ignition and the like and will enable the vehicle to get back to home base or to a service center.

Emergency switching is initiated by closing emergency switch 140. This energizes the solenoid of relay 124 causing its normally closed contactor 126 to open, and causing its normally open contactor 128 to close, thereby connecting battery 56 in parallel to battery 10 by way of components 168, 172, 176, 128, 187, 162, 118 and 156. Simultaneously, the opening of contactor 126 disconnects the power to the solenoid relays 108 and 100. This causes their contactors 110 and 102 to reopen and disconnect the load 136 from battery 56. As is seen, total power output from battery 56 and DC voltage output terminals 250 and 251 are now provided to the load 134 for emergency transit.

Relays 100, 108 and 116 are manufactured by the Essex Corporation of Logansport, Indiania and have part number 124-105111. Relay 124 is manufactured by the same company and has part number 124-305111. Diodes 150 and 152, are type 1N4005 and serve to short negative voltage spikes caused when relays 100, 108 and 116 open. Capacitors 154 and 154' in FIGS. 1-4 serve as filters to smooth the ripple in the DC circuits to which they are connected. Each of said capacitors is electrolytic, having a capacitance of 470 microfarads and a working voltage of 35 volts DC.

Figure 6:
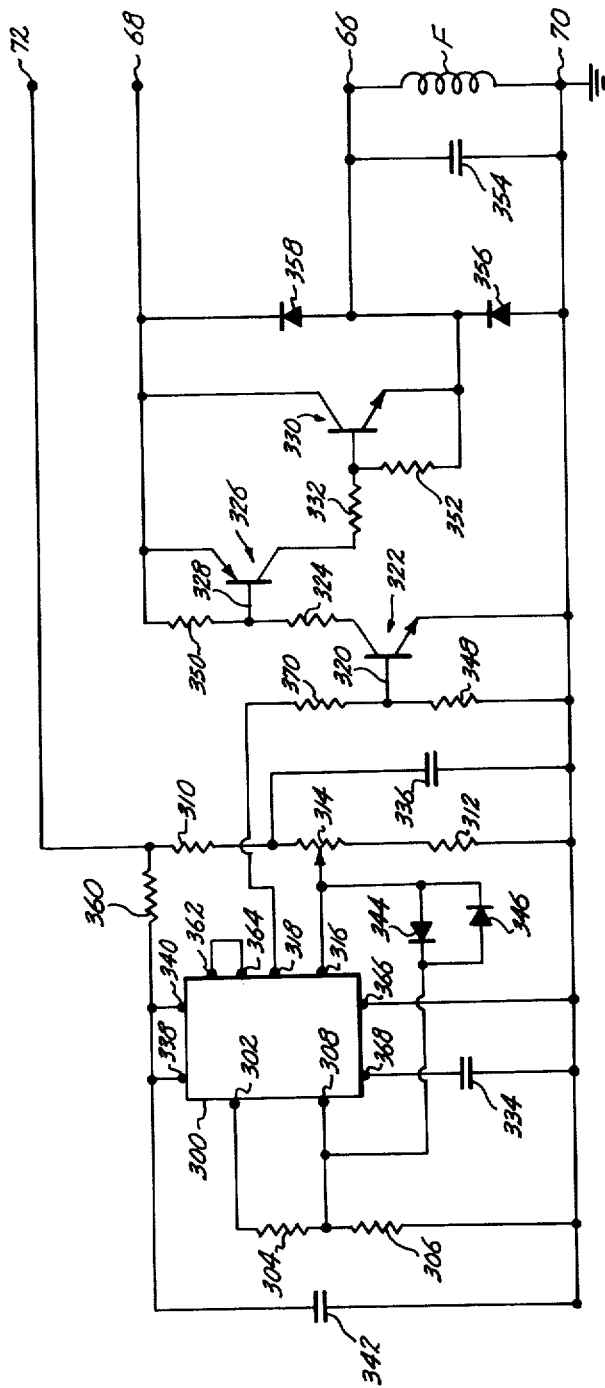
FIG. 6 is a schematic diagram of another embodiment of the present invention.

Applicant turns now to FIG. 6, which is a schematic circuit diagram of the voltage regulator 64 utilized in the embodiments of the present invention set forth in FIGS. 3 and 4. As has been described, the function of the voltage regulator 64 is to maintain the first and/or second DC voltages at the first and second rectifier output terminals 250, 251, respectively, at a predetermined desired level. In order to achieve this, sensing terminal 72 of the voltage regulator 64 is connected by wire 198 to either the first or second rectifier output terminals 250, 251. Power to drive the voltage regulator is received through its battery terminal 68 from either one of the batteries 10, 56 and/or rectifier 88. Ground terminal 70 is connected to ground. The voltage regulator 64 is responsive to changes in the first and/or second DC voltages present at the first and/or second rectifier output terminals 250, 251 and controls the voltage input to the field winding 26 of the alternator 24 from its field terminal 66 to maintain said first and second voltages at a predetermined, relatively constant level.

The heart of the voltage regulator 64 is a precision monolithic integrated circuit (IC) voltage regulator type 723C which has been given reference numeral 300. IC 300 consists of a temperature componsated reference amplifier, an error amplifier and an output transistor. Manufacture's terminals 2, 3, 4, 5, 6, 7, 9, 11, 12 and 13 have been designated with reference numerals 362, 364, 316, 308, 302, 366, 318, 338, 340 and 368.

Once the voltage regulator 64 has been connected to the circuit of the electrical power unit of the present invention as shown in FIGS. 3 and 4, the operation of the voltage regulator 64 is as follows. Reference voltage from terminals 302 of the IC 300 is supplied as shown, through the voltage divider formed by resistors 304 and 306 to terminal 308 of IC 300 which is the noninverting input of the error amplifier contained in the IC 300. The voltage from the sensing terminal 72 is applied, as shown, through the voltage divider formed by the resistors 310 and 312 and the potentiometer 314, to terminal 316 of the IC 300 which is the inverting input of the error amplifier contained in said IC 300.

If the voltage at the sensing terminal 72 is lower than desired, then the output voltage at terminal 318 of the IC regulator 300 is high. This voltage is then applied through resistor 370 to the base terminal 320 of NPN transistor 322. This causes transistor 322 to turn on and allows flow of current through resistor 324 from the base 328 of PNP transistor 326, turning it on.

Now, the current from voltage supply terminal 68 can flow through the base-emitter junction of NPN power transistor 330 to the field winding F of the alternator through terminal 66, limited only by the resistance value of resistor 332 and the reactance of the alternator field winding F. With proper selection of resistor 332, the resulting current brings the transistor 330 into forced beta (current gain) operation (beta less than five) resulting in extremely low collector-emitter saturation voltage and extremely low power loss in the transistor 330. The combination of PNP transistors 326 and NPN transistor 330 in the output of the voltage regulator was utilized because of the extremely low saturation voltage of transistor 330 and because a portion of the current supply to the field winding F of the alternator through terminal 66 must flow through the base of transistor 330, thus substantially increasing the efficiency of the regulator 64.

The current flow through the alternator field winding F from terminal 66 increases the output voltage of the alternator at terminal 66 which, in turn, increases the first and second DC voltages at terminals 250, 251, which are sensed at sensing terminal 72 of the regulator 74. If the voltage of sensing terminal 72 increases over a predetermined level at terminal 316 of the error amplifier of IC 300, which is set by potentiometer 314 and reference voltage at terminal 308 of the IC 300, the voltage at terminal 318 of IC 300 drops to zero. This shunts the current to the base 320 of transistor 322 and subsequently to transistors 326 and 330, and to the alternator field F through terminal 66. This causes the voltage produced by the alternator at terminals 28 to drop down and the cycle repeats again. The sensing action is achieved at least in part because of the combination of the high gain of the regulator 64 with the slow response of the alternator 24. In addition, proper selection of the capacitors 334 and 336 allows the regulator to lock on the alternator ripple frequency bringing the regulator 64 into pulse width modulation operation.

From the foregoing description of the operation of the regulator 64, it can be clearly visualized that under low voltage conditions at terminal 316 of IC 300, the alternator 24 is operated under a full field condition. This can be very undesirable when the continuity of the sensing lead 198 is accidently broken. However, this problem was overcome, as seen in FIG. 6, by powering the IC 300 through the sensing terminal 72. If the voltage supplied to the sensing terminal 72 is broken or interrupted, the power for the IC 300 is not available at terminals 338 and 340, resulting in zero voltage at terminal 318 and thus, no flow of current into the alternator field winding through terminal 66.

The overall functioning of the regulator 64 having now been given, a short description of the function of certain components thereof follows. Capacitor 342 protects the IC 300 against voltage transients. Diodes 344 and 346 protect the error amplifier in the IC 300 against large input voltage deviations. Resistors 348, 350 and 352 provide positive shut off of transistors 322, 326 and 330, respectively. Capacitor 354 provides radio frequency interference protection. Diode 356 shorts negative voltage spikes caused by abrupt current changes in the inductance of the field winding F of the alternator. Diode 358 conducts positive voltage spikes into the filter capacitor 154' seen in FIGS. 3 and 4. Resistor 360 drops the sensed voltage at terminal 72 to a level compatible with IC 300.

Features of applicant's regulator 64 which should be noted are that the totally independent remote sensing of the voltage to be regulated through terminal 72 of the regulator allows for complete compensation of voltage drops within the regulator 64 itself, and thus provides more precise voltage regulation of the first and second DC voltages at terminals 250, 251. This assures proper charging of the batteries 10, 56 thus substantially increasing their life expectancy. As has been noted, in case of accidental opening of the input to the regulator at terminal 72, the regulator 64 shuts off voltage to the alternator field F and thus prevents overcharging of the batteries 10, 56. In addition, the voltage regulator 64 permits more full utilization of the capability of the alternator 24 since the regulator 64 is powered, after an initial start-up, from an independent rectifier 88 having a third output voltage at terminal 252 which is higher than the first and second DC voltages at terminals 250 and 251. This higher, third DC voltage permits compensation for voltage drop within the regulator itself due to the inherent characteristics of semiconductors and consequently, the full allowable alternator field current through terminal 66 can be achieved. This accounts for the superior performance of the electrical power unit of the present invention at low alternator rotor RPM. Finally, the regulator 64's simplicity of design assures high reliability of the electrical power unit of the present invention. The quick connect, disconnect of the regulator 64 in case of failure and its easy repairability accound for a minimum of down time and expense.

However, it should be noted, that although the regulator 64 as heretofore described is preferred for the reasons set forth, it is well within the scope of the present invention that other regulators be used therein. Of course, the details of design of conventional voltage regulators vary, but any voltage regulator capable of handling the higher third DC voltage at terminal 252 could be used. In addition, a separate sensing terminal 72, although preferred, is not required.

Components utilized in the regulator shown in FIG. 6 for a typical 12 volt vehicle electrical system are as follows:

| | Resistors |
|---|---|
| 304, 306, 312, 318 | 2.2 K ohms, ¼ watt |
| 348, 350, 352 | 2.2 K ohms, ¼ watt |
| 310 | 6.8 K ohms, |
| 324 | 220 ohms, 2 watts |
| 332 | 5.6 ohms, 1 watt |
| 360 | 22 ohms |
| | Potentiometer |
| 314 | 1 K ohm |
| | Capacitor |
| 336, 342 | .33 microfarads, 35 volts |
| 334, 354 | .0023 microfarads, 1 Kv |
| | Diodes |
| 344, 346, 358 | 1N4005 |
| 356 | MR 751 |
| | Transistors |
| 322 | 2N3704 |

| -continued | |
|---|---|
| 326 | T1P32A |
| 330 | 2N5882 or 2N5885 |

From the foregoing, various further applications, modifications, and adaptations of the apparatus disclosed by the foregoing preferred embodiments of the present invention will be apparent to those skilled in the art to which the present invention is addressed, within the scope of the following claims.

What is claimed is:

1. An electrical power unit for increasing the DC power output of an electrical generating system on an engine driven vehicle, the said system being of the type including a first DC storage battery having a characteristic voltage; a dynamo driven by said vehicle engine and having a field winding terminal, a plurality of AC voltage output terminal means having a regulated and substantially constant amplitude AC output voltage thereon, and a DC output terminal isolated from said electrical generating system and which under normal use delivers low voltage DC power to said electrical generating system; and voltage regulator means having input means connected to said DC storage battery and a field output terminal connected to said field winding terminal of said dynamo controlling the field in said dynamo in response to variations in voltage at said DC output terminal; the said power unit comprising:

(a) step down transformer means connected to said plurality of AC voltage output terminal means for producing a first lower AC voltage; and (b) means for rectifying said first lower AC voltage to produce a first DC voltage at a first rectifier output terminal having increased power capability in proportion to the turns ratio of said step down transformer means; wherein said input means on said voltage regulator means is connected to said first rectifier output terminal and said voltage regulator means is responsive to variations in said first DC voltage to maintain said first DC voltage at a relatively constant, desired and nonvariable level, and wherein said first rectifier output terminal is connected to said first battery to maintain the charge thereof and to supply power to any electrical load applied to said first battery.

2. The electrical power unit of claim 1, wherein the characteristic voltage of said first battery is approximately 12 volts, and the voltage regulator means maintains said first DC voltage at approximately 14 volts.

3. The electrical power unit of claim 1, further comprising a second DC storage battery having a characteristic voltage, wherein said rectifier means further produce a second DC voltage at a second rectifier output terminal which is adapted to be connected to said second battery to maintain the charge thereof and to supply power to any electrical load which may be applied to said second battery.

4. The electrical power unit of claim 3, wherein the characteristic voltages of said first and second batteries are approximately 12 volts, and the voltage regulator means maintains said first and second DC voltages at approximately 14 volts.

5. The electrical power unit of claim 3, further comprising means for maintaining said first and second storage batteries, and any loads which may be applied thereto, electrically independent.

6. An electrical power unit for increasing the DC power output of an electrical generating system on an engine driven vehicle, the said generating system being of the type including a first DC storage battery having a characteristic voltage; a dynamo driven by said vehicle engine and having a field winding terminal for controlling the field within said dynamo and a plurality of AC voltage output terminal means having a regulated and substantially constant amplitude AC output voltage thereon delivering dynamo AC voltage to said generating system; the said power unit comprising:

(a) step down transformer means connected to said plurality of AC voltage output terminal means producing first and second lower AC voltages;

(b) means for rectifying said first lower AC voltage to produce a first DC voltage at a first rectifier output terminal, and for rectifying said second lower AC voltage to produce a third DC voltage at a third rectifier output terminal, wherein said third DC voltage is greater than said first DC voltage and wherein said first DC voltage is greater than said first DC voltage and wherein said first DC voltage has increased power capability in proportion to the turns ratio of said step down transformer means; and (c) voltage regulating means, having input means connected to said first battery and to said third rectifier output terminal, and having an output terminal connected to said field winding terminal of said dynamo, said voltage regulator means maintaining said first DC voltage at a relatively constant, desired level in response to variations in said first DC voltage, said first rectifier output terminal connected to said first battery to mantain the charge thereof and to supply power to any electrical load applied to said first battery.

7. The electrical power unit of claim 6, wherein said third DC voltage is approximately 18 volts, the characteristic voltage of said first battery is approximately 12 volts, and the voltage regulator means maintains said first DC voltage at approximately 14 volts.

8. The electrical power unit of claim 6, further comprising a second DC storage battery having a characteristic voltage, wherein said means for rectifying further produces a second DC voltage at a second rectifier output terminal said second rectifier output terminal being adapted to be connected to said second battery to maintain the charge thereof and to supply power to any electrical load which may be applied to said second battery.

9. The electrical power unit of claim 8, wherein said third DC voltage is approximately 18 volts, the characteristic voltages of said first and second batteries are approximately 12 volts, and the voltage regulator means maintain said first DC voltage at approximately 14 volts.

10. The electrical power unit of claim 8, further comprising means for maintaining said first and second storage batteries and any loads which may be applied thereto electrically independent so that one of the storage batteries may be discharged independently of the other.

11. The electrical power unit of claim 10, wherein said third DC voltage is approximately 18 volts. The characteristic voltage of said first and second batteries are approximately 12 volts, and the voltage regulator means maintains said first DC voltage at approximately 14 volts.

12. The electrical power unit of claim 6, further comprising:
   (a) a second DC storage battery having a characteristic voltage wherein said means for rectifying further produce a second DC voltage at a second rectifier output terminal which is adapted to be connected to said second battery maintain the charge of said second battery and to supply power to any electrical load which may be applied to said second battery; and
   (b) means for disconnecting said second battery from loads which may be applied thereto and for connecting said first and second DC storage batteries in parallel.

13. The electrical power unit of claim 12, wherein said third DC voltage is approximately 18 volts, the characteristic voltages of said first and second batteries are approximately 12 volts, and the voltage regulator means maintain said first DC voltage at approximately 14 volts.

14. A method for increasing the DC power output of an electrical generating system on an engine driven vehicle, the said electrical generating system. being of the type including a DC storage battery; a dynamo driven by said vehicle engine and having a field winding terminal, a plurality of AC voltage output terminal means having a regulated and substantially constant amplitude output AC voltage thereon, and a DC output terminal which under normal use delivers low voltage DC power to said generating system; and a voltage regultor having a battery input terminal connected to said DC storage battery and a field terminal output means connected to a field winding terminal on said dynamo; said method comprising the following steps:
   (a) isolating said engine driven dynamo from said electrical generating system by removing load connections from said DC output terminal of said engine driven dynamo;
   (b) increasing said dynamo AC voltage at said plurality of AC voltage output terminal means by applying said dynamo AC voltage to a primary winding of a step down transformer means producing a first lower AC voltage from a first secondary winding of said transformer means;
   (c) rectifying said first lower AC voltage thereby producing a first DC voltage output having an increased power capability in proportion to the turns ratio of said step down transformer means; and
   (d) controlling the field winding of said engine driven dynamo in response to variations in said first DC voltage output to maintain said first DC voltage at a relatively constant, desired and nonvariable level.

15. The method of claim 14, further comprising the step of controlling the field winding of said dynamo in response to variations in said first DC voltage to maintain said first DC voltage at approximately 14 volts.

16. The method of claim 14, further comprising the steps of:
   (a) rectifying said first lowered AC voltage and producing a second DC voltage, wherein said first and second DC voltages are approximately equal.

17. The method of claim 16, further comprising the step of controlling the field winding of said dynamo in response to variations in one of said first DC voltages to maintain said first and second DC voltages at approximately 14 volts.

18. The method of claim 14, further comprising the steps of:
   (a) producing a second lowered AC voltage with said transformer means;
   (b) rectifiying said second lowered AC voltage to produce a third DC voltage which is greater than said first DC voltage; and
   (c) supplying power to said field winding of said dynamo using said third DC voltage output.

19. The method of claim 18, further comprising the steps of:
   (a) controlling the field winding of said dynamo in response to variations in said first DC voltage to maintain said first DC voltage at approximately 14 volts; and
   (b) maintaining said third DC voltage at approximatly 18 volts.

20. The method of claim 18, further comprising the steps of producing a second DC voltage from said first lowered AC voltage, wherein said first and second DC voltages are approximately equal.

21. The method of claim 20, further comprising the steps of:
   (a) controlling the field winding of said dynamo in response to variations in said first DC voltage to maintain said first and second DC voltages at approximately 14 volts; and
   (b) maintaining said third DC voltage at approximately 18 volts.

* * * * *